UNITED STATES PATENT OFFICE.

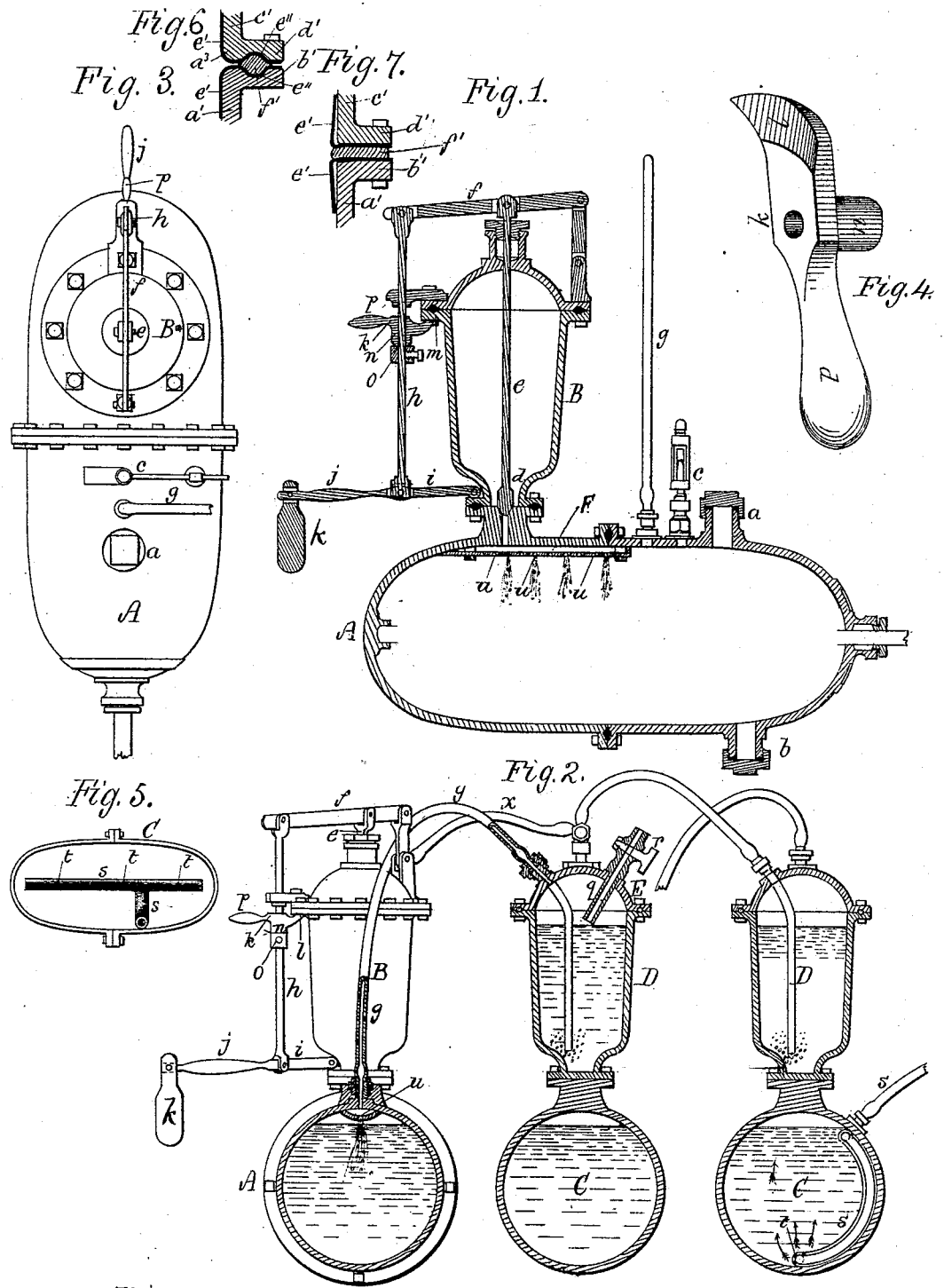

ALVIN D. PUFFER, JR., AND LUTHER W. PUFFER, OF MEDFORD, MASS.

AERATED-WATER APPARATUS.

SPECIFICATION forming part of Letters Patent No. 275,076, dated April 3, 1883.

Application filed April 13, 1882. (No model.)

*To all whom it may concern:*

Be it known that we, ALVIN DAVIS PUFFER, Jr., and LUTHER WINTHROP PUFFER, citizens of the United States, residing at Medford, in the county of Middlesex and State of Massachusetts, have invented certain new and useful Improvements in Aerated-Water Apparatus; and we do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

These improvements relate to those portions of apparatus for the manufacture of soda or other aerated waters termed the "generator," "purifier," and "receiver" or "fountain;" and said invention consists partly in connecting with the tail of the lever which actuates the valve of the "acid-pot," so called, the upper end of a rod or pitman, the lower part of which is pivoted to a hand-lever supported at the top of the generator in a position to be readily grasped by the attendant, a locking-cam being secured to said rod, and operating with the bottom of the flange upon the top of the acid pot or a projection from such pot to lock or secure the valve in its closed position, such valve being opened by lifting the hand-lever, and preferably closed by a weight. We distribute the acid, as it approaches the generator, over an extended surface by the employment of a trough of considerable area, situated at the top of the interior of the generator, so as to intercept the acid as it leaves the pot, the bottom of this trough being punctured with numerous orifices to precipitate the acid in drops into the water in the generator over a large area, or to carry and deliver the acid to the center of the cylinder.

Details of our invention consist in the peculiar form of the orifices in the foraminous trough as being countersunk upon the under side to prevent clogging of the openings from below; in the combination, with the sections of the generator or cylinder, or the same and the acid-pot, and purifiers, of a packing-joint, to be explained; and in other incidental features, to be explained hereinafter.

The drawings accompanying this specification represent, in Figure 1, a vertical longitudinal section, in Fig. 2 a cross-section, and in Fig. 3 a plan, of a generator and acid-pot containing a portion of our improvements. Fig. 4 is an enlarged view of the wiper-cam for securing valve in acid-pot and maintaining it closed. Fig. 5 is a plan of the interior of one of the receivers or cylinders, showing the perforated gas-supply pipe therein. Figs. 6 and 7 represent detail sectional views of the joints.

Upon referring to the above-named drawings, A represents the generator of an apparatus for charging water with carbonic-acid gas, this generator being provided with a filling-orifice, $a$, discharge-outlet $b$, and a safety-valve, $c$, in the usual manner.

B represents the acid-pot connected with the generator, the valve of such pot being shown at $d$, its stem at $e$, the lever pivoted to the top of the pot and operating the valve at $f$, while the pipe which conducts gas from the generator to the purifier is shown at $g$, all being, as heretofore, constructed with equalizing-pipe $x$.

C in the drawings represents one of a cluster of cylinders, receivers, or fountains employed in the manufacture of aerated waters to contain the water while being charged with gas, while D represents a purifying-vessel secured to the top of such cylinder, and in practice communicating with its interior by a suitable pipe.

We provide a vertical pitman, $h$, the upper end of which we pivot to the tail of the lever $f$ and the lower end of which is in turn pivoted to the middle, or thereabout, of a horizontal hand-lever, $i$, the base of which is pivoted to the lower part of the acid-pot or the top of the generator, as the case may be, while its free end is converted into a handle, $j$, which stands at such an elevation with respect to the floor of the apartment as to enable the attendant to readily grasp and operate it, this handle being preferably weighted, that the valve may be self-closing. The method of connecting and operating the lever $f$ is a modification of that shown and described in Letters Patent of the United States, numbered 254,371, issued on the 28th day of February, A. D. 1882, in which the tail of the lever is weighted and connected with one end of a cord or chain, which passes over a pulley pivoted above the lever, the cord descending and being secured at its lower end to a foot-pedal or a stirrup, in order that the valve of the acid-pot may be opened by the foot of the operator.

It is customary and important in apparatus for manufacturing soda and other aerated water to lock the valve of the acid-pot securely in its closed position, to prevent premature or accidental escape of acid. To effect this locking of the said valve we employ a cam in the form of a horizontal arm or plate, $k$, the nose or inner end of which is beveled, as shown at $l$, to produce an inclined plane or cam, which extends beneath the flange $m$ upon the upper part of the acid-pot, the said arm or plate $k$ having a hub, $n$, which surrounds the pitman $h$, and being thereby adjusted in height upon said rod, in order that the position of the cam with respect to the flange of the acid-pot, the valve, and its seat may be adjusted to insure closing of the valve under all circumstances. The cam-plate $k$ is secured loosely upon the rod $h$, in order to turn upon the latter and free itself from engagement with the flange of the acid-pot; and to confine the said cam-plate to the rod we employ a sleeve or collar, $o$, secured to such rod by a set-screw or otherwise. The outer end of the cam-plate $k$ terminates in a handle, $p$, for convenience in turning the former.

We secure to the upper part of the dome or cover E of the purifier D a pipe, $q$, which extends into the said purifier a short distance, as shown in Fig. 2 of the drawings, the outer end of this pipe protruding beyond the exterior of the dome E, and being provided with a cock, $r$, of ordinary or any suitable construction. The inner lower end of the pipe $q$ determines the water-level of the purifier, above which the water is not to be allowed to rise.

As before stated, the cock $r$, provided for supplying the purifier with water, is to be closed, and at times to be opened and again closed as soon as water ceases to run from it. The cock $r$, furthermore, enables the attendant at any time to ascertain whether or not the water in the purifier is above its legitimate level by overflow from the generator. If so, the evil is at once corrected by escape of surplus water through such cock, the water above the lower end of the tube $q$ being forced up by the expansive action of the gas in purifier D.

We employ a pipe, $s$, leading into the cylinder C through the top or upper part of the latter. This pipe, after entering such cylinder, hugs its interior periphery and extends partially above the latter to its bottom, thence toward one or both ends, the portion of this pipe lying upon the floor of the receiver being perforated at frequent intervals with numerous small holes, $t\,t$. Pipe $s$ is ordinarily connected to one of the purifying-vessels D, though such connection is not shown in the drawings, as any other source of supply of suitable gas will answer. The gas flowing through the pipe $s$ escapes through the numerous perforations $t$, &c., and is by the latter subdivided into minute globules, and in this condition permeates the water, and is in its passage thoroughly absorbed by such water.

We carry out another feature of our improvements by the employment of a trough or chute, F, placed in the upper part of the generator A, below the outlet of the acid-pot; and in order to distribute the acid from such pot over an extended surface we perforate the bottom of the trough with numerous small holes, $u\,u$, &c., through which the acid admitted to the trough trickles and descends into the water in the generator. The holes $u\,u$, &c., we prefer to countersink from the under side, as shown, in order to diminish as far as possible liability of clogging or obstruction of such holes from the disturbance within the generator of the solution contained therein. By thus countersinking the holes $u\,u$ lodgment of any amount of sediment therein would be impossible, and the small quantity which might tend to collect would be expelled by the superior specific gravity of the acid in its passage through said holes with its corrosive tendency.

The trough may be open at its ends, to permit of escape of acid thereat; or such ends may be closed and the acid permitted to escape only by the perforations in the bottom; or a series of openings or notches may be made in the upper edges of the trough at its point of junction with the roof of the generator to permit of escape of overflow.

To support the trough in place within the generator, we preferably employ loops or clips $v\,v$, depending from the roof of the generator, in which loops the ends of the trough are inserted.

In Fig. 6 of the drawings we have shown a section of a portion of the joint between the acid-pot and generator as containing a feature of our improvements; but this construction is applicable to the other joint of the apparatus. In this sectional figure a portion of the body of the generator is shown at $a'$ and its flange at $b'$, while $c'$ represents a portion of the lower part of the acid-pot, and $d'$ the flange of the latter, the lining of each being shown at $e'$ by a heavy black line.

We create in each flange $b'\,d'$ an annular concave channel, $e''$, and we extend the edges of each lining $e'$ about the adjacent edges of the parts $a'\,c'$, and into these channels or grooves $e''$, the corners $g'$ of such parts $a'\,c'$ being considerably rounded, as shown at $a^3$. We then provide an annular band or ring, $f'$, of india-rubber, of a diameter equal to that of such channel $e''$, and of a form in cross-section circular, or approximating that of such channel, and after inserting this elastic ring between the edges of the linings in the two channels we bolt the flanges $b'\,d'$ firmly together, thereby providing a tight joint between the acid-pot and generator, though the main purpose of this portion of our invention is to prevent loosening and collapse of the linings $e'$. These linings are comparatively thin and light, and absorb the heat from the contents of the generator much sooner than the iron body of the latter, thereby expanding the lining and tending to draw its edges away from the joint between the flanges $b'$ $d'$. The expansion and contraction of the lining tend also to fracture the lining at the sharp corners of the parts $a'$ $c'$.

The tendency of internal pressure in the generator is to crowd the cylindrical ring $f'$ more tightly into the channels $e''$; hence the joint becomes to a certain extent self-packing, while by rounding the corners of the parts $a'$ $c'$ the sharp corners of the lining in the old method are avoided. The form of the channels $e''$ and packing-ring $f'$ is such that pressure upon the ring by bolting together the flanges tends to confine the edges of the linings more securely in place, thereby preventing separation of the lining from the wall of the vessel and preventing collapse of such lining to a great extent.

Owing to the fact of the cylindrical packing-ring $f'$ being self-packing to a certain extent, as stated, it is not necessary to bolt the flanges together with the same pressure as with ordinary packings. For this reason the frequent fracture of the flanges which now occurs is avoided and less metal is requisite in casting the body of the vessel.

We claim—

1. In combination with the generator, its intercommunicating acid-pot, and the outlet-valve of the latter, a lever connected with the stem of such valve and pivoted to the top of the pot, and a pitman connecting at one end with the tail of said lever and at the other with a second and hand lever of lower altitude than the first, this hand-lever being pivoted to the lower part of the acid-pot or other suitable part of the apparatus, and standing at an elevation to be readily seized and operated by the attendant and made self-closing by the weight at the end thereof.

2. The combination, with the generator, its intercommunicating acid-pot, and the valve governing the outlet of the latter, of a lever connected with the stem of said valve and pivoted to the top of the pot, and a pitman connecting at one end with the tail of said lever and at the other with a second lever (which is a hand-lever) of lower altitude than the first, this hand-lever being pivoted to a suitable part of the structure, and having secured adjustably to it a cam or eccentric operating with the flange of the acid-pot, or a boss upon the same to lock the valve of such pot in its closed position.

3. In combination with the parts $a'$ $c'$, the channels $e''$ $e''$, linings $e'$ $e'$, and ring $f'$.

4. The linings $e'$, depressed into the channels $e''$, in combination with a suitable packing-ring for containing them in the latter.

5. In combination with the parts $a'$ $c'$, the channels $e''$, rounded corners $a^3$, linings $e'$, and elastic ring $f'$.

6. In combination with an acid-pot and a generator, a horizontal trough located in the upper part of the generator and receiving the acid from said pot and perforated at intervals to discharge the acid within the generator.

In testimony whereof we affix our signatures in presence of two witnesses.

ALVIN DAVIS PUFFER, JR.
LUTHER WINTHROP PUFFER.

Witnesses:
H. E. LODGE,
F. CURTIS.